Patented Feb. 24, 1931

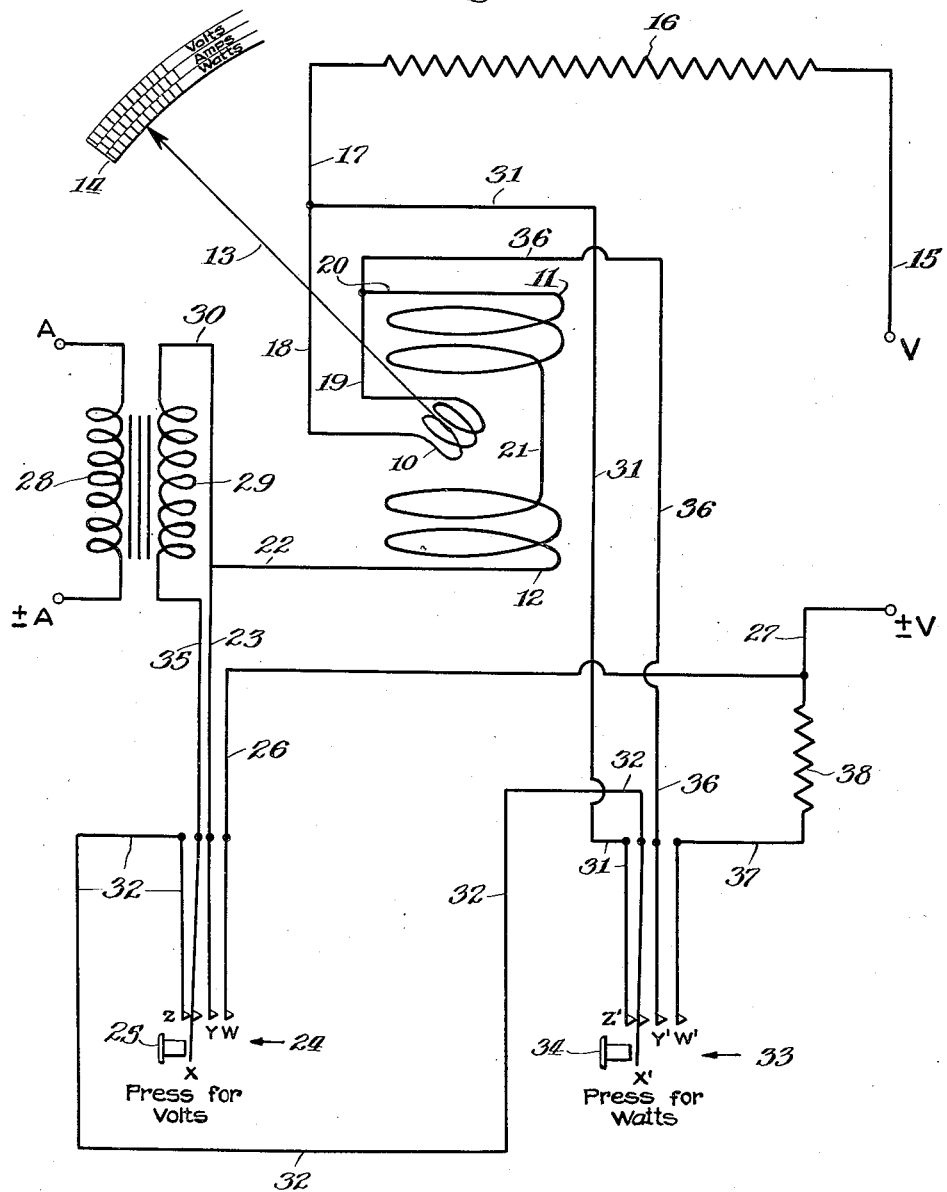

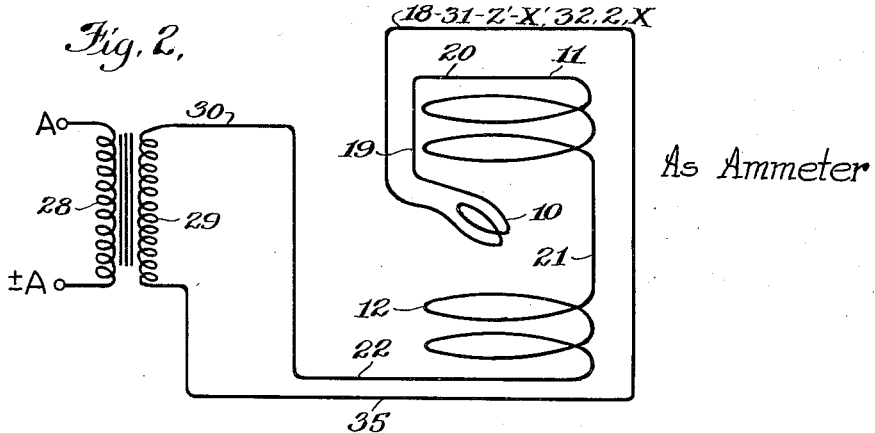
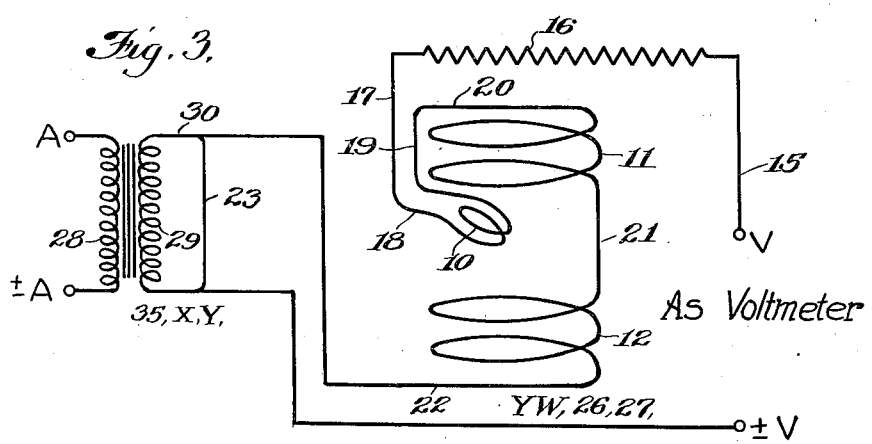
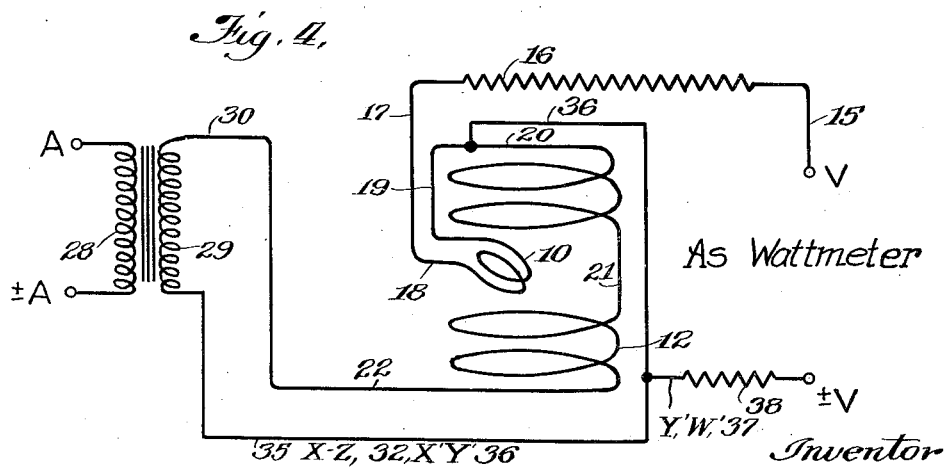

1,794,117

UNITED STATES PATENT OFFICE

JOHN H. MILLER, OF OAK PARK, ILLINOIS, ASSIGNOR TO JEWELL ELECTRICAL INSTRUMENT CO., OF CHICAGO, ILLINOIS, A CORPORATION OF ILLINOIS

ELECTRIC METER

Application filed April 23, 1928, Serial No. 272,231. Renewed October 6, 1930.

This invention relates to electric meters and it pertains more particularly to an instrument of the electro-dynamometer type in which the same operating coils may be connected to provide an ammeter, voltmeter or wattmeter.

An object of my invention is to provide an improved circuit whereby a single instrument may take the place of three instruments.

Another object is to provide a dynamometer instrument so arranged that volts, amperes and watts can all be read on the same instrument, using the same movement, with appropriate switching means.

A further object is to provide a combination ammeter, voltmeter and wattmeter including a current transformer, the secondary of which is always short-circuited.

Other objects will be apparent as the detailed description of my invention proceeds.

In the accompanying drawings, which represent a preferred embodiment of my invention and in which similar parts are designated by similar reference characters throughout the several figures;

Fig. 1 is a wiring diagram of my combined ammeter, voltmeter and wattmeter;

Fig. 2 is a detail of the connections when the instrument acts as an ammeter and neither button is pressed;

Fig. 3 is a detail of the connections when the voltmeter button is pressed; and

Fig. 4 is a detail of the connections when the wattmeter button is pressed.

The preferred embodiment hereinafter described is designed to give a full scale deflection on five amperes, 150 volts, and 750 watts but it is understood that these values and the details hereinafter described are exemplary only and that the invention is not limited to any such details except as defined by the appended claims.

The meter consists generally of a moving coil 10 disposed between fixed coils 11 and 12, said moving coil carrying an indicator 13 pointing to a scale 14 which is calibrated in volts, amperes and watts, as will be hereinafter set forth. The moving coil is of fine wire with a resistance of about 100 ohms, while the total combined resistance of fixed coils 11 and 12 is about 1000 ohms. These coils should be designed to carry a current of about .025 amperes for full scale deflection.

The current transformer for this instrument will, therefore, have to transform five amperes down to .025 amperes or will have to have a ratio of 200 to 1. Such a transformer is easily placed in a small space and it should be noted that it does not have to have an accurate or rather constant ratio over the whole range because the instrument is calibrated with the current transformer right in the circuit and its deviations from a straight line characteristic are taken care of in the making of the scale. The design of such a transformer forms no part of the present invention and will not be described in detail.

To obtain full scale deflection at 150 volts, it is necessary that the circuit have a total resistance of 6000 ohms and since the fixed and moving coils together have a resistance of 1,100 ohms, an additional resistance of 4,900 ohms of zero temperature co-efficient wire will be required. This will give a current of 25 milliamperes at full scale deflection.

The meter is provided with a suitable case and with suitably designated voltmeter and ammeter terminals. These elements however, will not be described in detail.

When the instrument is used as a wattmeter, the fixed coils are cut out of the voltmeter circuit and it is necessary to add another resistance of 1000 ohms to compensate therefor, as will be hereinafter described.

Referring to Fig. 1, the connections may be briefly outlined as follows: Voltage terminal V is connected by a wire 15 to resistance 16 of 4900 ohms. This resistance is connected by conductors 17 and 18 to the movable coil 10 which is, in turn, connected by conductors 19 and 20 to fixed coil 11. Coil 11 is connected by conductor 21 to coil 12 which is connected by wires 22 and 23 to a switch blade $y$ in switch 24, said switch preferably being of the push button type although any other suitable switch may be used for this purpose. When the push button 25 is operated, switch blade $y$ contacts with switch blade $w$ which is connected by conductors 26 and 27 to the other voltage terminal ± V.

The primary coil 28 of the transformer is directly connected to ammeter terminals A, ± A. One end of the secondary 29 is connected by wires 30 and 22 to fixed coil 12 which is connected by wire 21 to fixed coil 11, this coil being connected by conductors 20 and 19 to movable coil 10, which is, in turn, connected by conductors 18 and 31 to switch blade $z'$ of switch 33. When switch button 34 is in normal position, switch blade $z'$ makes contact with switch blade $x'$ which is connected by wire 32 to switch blade $z$ of switch 24. This blade is likewise in contact with switch blade $x$ and the latter is connected by wire 35 to the other end of secondary 29.

While the instruments may be designed to read volts or watts directly, I have described in this embodiment an instrument adapted to read amperes because it is important in instruments of this character that the secondary of the transformer be short-circuited at all times. I have provided a means for short-circuiting this secondary when the device is used as a voltmeter by designing my switch in such a manner that switch blade $x$ contacts with switch blade $y$ before the circuit is broken between switch blade $x$ and switch blade $z$. Switch 33 is designed in the same manner so that in no case is it possible for the transformer secondary to be open-circuited.

When the instrument is used as a wattmeter and the fixed coils are cut out of the voltmeter circuit, it is necessary to compensate for this resistance and I have provided for this by connecting switch blade $w'$ through conductor 37 to a resistance 38 of 1000 ohms (that is, the same as the resistance of coils 11 and 12).

The operation of my improved meter may be briefly described as follows: When neither switch button is pressed the instrument is connected as shown in Fig. 2—that is, the voltmeter circuit is open at $w$ and $w'$ and the secondary of the transformer 29 is connected through conductors 30 and 22, fixed coil 12, conductor 21, fixed coil 11, conductors 20 and 19, movable coil 10, conductors 18 and 31, switch contacts $z'$—$x'$, conductor 32, switch contacts $z$—$x$ and conductor 35 to the other terminal of the secondary 39. The moving coil will then be rotated in accordance with the current flowing through the coils and the scale may be suitably calibrated.

When the voltmeter button 25 is pressed, the secondary of the transformer is shorted through conductors 35, switch contacts $x$ and $y$ and conductors 23 and 30. Also switch blade $y$ contacts switch blade $w$ and closes the voltage circuit, as illustrated in Fig. 3. This circuit consists of conductor 15, resistance 16, conductors 17 and 18, moving coil 10, conductors 19 and 20, fixed coil 11, conductor 21, fixed coil 12, conductors 22 and 23, contact point $y$—$w$ and conductors 26 and 27, connected in the order stated.

In Fig. 4 I have shown the circuit which results when the switch button 34 is pressed. It should be noted that in this circuit, connector 36 is common to both the current and the voltage circuits, that the moving coil is energized by current through the voltmeter connections and that the fixed coils are energized by current from the ammeter connections. The voltmeter circuit is: terminal V, conductor 15, resistance 16, conductors 17 and 18, moving coil 10, conductors 19 and 36, contact points $y'$ and $w'$, conductor 37, resistance 38 (equivalent to resistance of coil 11 plus coil 12) and terminal ± V. The ammeter circuit in this circuit is: secondary 29, conductors 30 and 22, fixed coil 12, conductor 21, fixed coil 11, conductors 20 and 36, contact points $x'$—$y'$, conductor 32, contact points $x$—$z$ and conductor 35.

An instrument as described above is of considerable value in taking motor characteristics and, in fact, the characteristics of any load where the power factor is less than unity. When the current posts are connected in series with the line and the voltage posts are connected across it, the amperes may be read, and then the volts and then the watts by means of the push buttons. The power factor is then figured by dividing the watts by the products of volts and amperes and the complete story of that particular load is known. With apparatus now on the market three separate instruments are required to obtain this information. Three instruments are not only much more expensive to build but they are also more bulky and this is of particular importance in the case where instruments must be transported and handled by service men.

It is obvious that the resistance may be varied to give a reading of any desired magnitude—that is, the full scale wattmeter reading need not correspond with the full scale voltmeter and ammeter readings.

It is also obvious that the transformer may be entirely dispensed with if the currents to be measured are of the proper magnitude and the expression ammeter terminals as used in the accompanying claims is intended to cover this case. The terminals of a transformer secondary may also be called ammeter terminals within the meaning of my invention.

I claim:

1. A meter comprising a transformer, fixed and movable electro-dynamometer coils, connections between the terminals of the transformer secondary and at least one of said coils, switch means in said connections whereby said dynamometer coils may be short-circuited and means whereby the circuit through the transformer secondary is closed under all conditions.

2. A meter comprising voltmeter terminals, ammeter terminals, fixed and movable dynamometer coils connected in series, connections from said coils to said voltmeter and said ammeter terminals respectively including a conductor common to both circuits, a resistance adapted to compensate for the electro-dynamometer coils cut out of the voltmeter circuit, and switch means for selectively connecting said coils in series with the ammeter terminals, in series with the voltmeter terminals, or the fixed coil with one and the moving coil with the other whereby the instrument may operate as a wattmeter, voltmeter and ammeter.

3. An electrical circuit comprising a transformer, an electro-dynamometer coil, a switch, a connection from a terminal of the transformer secondary to a switch blade, a connection from the other terminal of the transformer secondary to a second switch blade and to said electro-dynamometer coil, a second switch, connections from said coil to a blade of said second switch, a second blade of the second switch normally in contact with said first blade, a connection from said second blade to a third blade of the first switch, and means whereby the contact between the first and third blades of the first switch is not broken until contact between the first and second blade is established.

4. An electric circuit comprising two relatively movable dynamometer coils connected in series, voltmeter terminals, ammeter terminals, a voltmeter switch, a wattmeter switch, connections from one end of the coils to the voltmeter switch and to one ammeter terminal, connections from the other end of said coils to a wattmeter switch and a voltmeter terminal, connections from a point intermediate said coils to said wattmeter switch, a connection from the other ammeter terminal to the voltmeter switch, and a connection from the voltmeter switch to the wattmeter switch whereby the meter serves as a combined voltmeter, ammeter and wattmeter.

5. In a device of the class described, a meter comprising a transformer, voltmeter terminals, fixed and movable electro-dynamometer coils, connections from said transformer to said coils, connections from said voltmeter terminals to said coils, means whereby the circuit through the transformer secondary is closed under all conditions, and means for selectively connecting said coils to said transformer and to said voltmeter terminals.

6. In a device of the class described, a meter comprising ammeter terminals, voltmeter terminals, fixed and movable electro-dynamometer coils, connections from said terminals to said coils, a transformer for transforming the current from the ammeter terminals, means for selectively connecting said coils to said ammeter and voltmeter terminals respectively, and means whereby the circuit through the transformer secondary is closed under all conditions.

7. A combined ammeter, voltmeter and wattmeter comprising a movable coil, an indicator actuated thereby, a fixed coil associated with said movable coil, means for selectively connecting said coils in series with voltmeter and ammeter connections respectively whereby said instrument may function as an ammeter or a voltmeter, switch means in said connections for connecting one of said coils to said ammeter connections and the other to said voltmeter connections such that the same elements cooperate to form a wattmeter, a transformer for transforming the current from the ammeter connections, and means whereby the circuit through the transformer secondary is closed under all conditions.

8. In a measuring instrument of the dynamometer type, the combination of a fixed field winding, with a movable winding adapted to be actuated by the energization of said field winding, said windings being connected with each other in series, a current transformer for supplying current at reduced amperage to said windings, indicating means associated with said movable windings, said indicating means being calibrated in electrical units with said transformer and terminals connected with said windings for current measurement.

9. In a measuring instrument of the dynamometer type, the combination of a fixed field winding, with a movable winding adapted to be actuated by the energization of said field winding, said windings being connected with each other in series, a current transformer for supplying current at reduced amperage to said windings, indicating means associated with said movable winding, said indicating means being calibrated in electrical units with said transformer, terminals connected with said windings for current measurement, voltage terminals connected in series with said windings for measuring voltage, and selective switching means for completing the circuit to either current or voltage terminals.

10. In a measuring instrument of the dynamometer type, the combination of a fixed field winding, with a movable winding adapted to be actuated by the energization of said field winding, said windings being connected with each other in series, a current transformer for supplying current at reduced amperage to said windings, indicating means associated with said movable winding, said indicating means being calibrated in electrical units with said transformer, terminals connected with said windings for current measurement, voltage terminals connected in series with said windings for measuring voltage, and selective switching means for completing the circuit to either current or voltage terminals, and adapted to short circuit the secondary of said transformer.

11. In a measuring instrument of the dynamometer type, the combination of a fixed field winding, with a movable winding adapted to be actuated by the energization of said field winding, said windings being connected with each other in series, a current transformer for supplying current at reduced amperage to said windings, indicating means associated with said movable winding, said indicating means being calibrated in electrical units with said transformer, ammeter terminals for the primary of said transformer, voltmeter terminals for said windings, and means for connecting one of said voltmeter terminals and one end of said secondary to the juncture of said windings to provide a wattmeter.

12. In a measuring instrument the combination of a fixed field winding adapted for low current with a low current movable winding adapted to be actuated by energization of said field winding, said windings being connected in series, ammeter terminals for supplying current to said windings, voltmeter terminals for connecting said windings to a voltage circuit, and selective switch means for selectively connecting said windings with said terminals to provide ammeter, voltmeter and wattmeter actuation of said movable winding.

13. In a measuring instrument the combination of a fixed field winding adapted for low current with a low current movable winding adapted to be actuated by energization of said field winding, said windings being connected in series, ammeter terminals for supplying current to said windings, voltmeter terminals for connecting said windings to a voltage circuit, selective switch means for selectively connecting said windings with said terminals to provide ammeter, voltmeter and wattmeter actuation of said movable winding, and a current transformer adapted to supply low amperage current to said windings and interposed between said windings and said ammeter terminals.

14. In a measuring instrument the combination of a fixed field winding adapted for low current with a low current movable winding adapted to be actuated by energization of said field winding, said windings being connected in series, ammeter terminals for supplying current to said windings, voltmeter terminals for connecting said windings to a voltage circuit, selective switch means for selectively connecting said windings with said terminals to provide ammeter, voltmeter and wattmeter actuation of said movable winding, and a current transformer adapted to supply low amperage current to said windings and interposed between said windings and said ammeter terminals, said switching means being adapted to cut out said transformer and short circuit the secondary of said transformer.

15. In a measuring instrument the combination of a fixed field winding adapted for low current with a low current movable winding adapted to be actuated by energization of said field winding, said windings being connected in series, ammeter terminals for supplying current to said windings, voltmeter terminals for connecting said windings to a voltage circuit, selective switch means for selectively connecting said windings with said terminals to provide ammeter, voltmeter and wattmeter actuation of said movable winding, a common dial having volt, watt and ampere scales, and indicating means associated with said movable winding and said scales.

16. In a measuring instrument the combination of a fixed field winding adapted for low current with a low current movable winding adapted to be actuated by energization of said field winding, said windings being connected in series, ammeter terminals for supplying current to said windings, voltmeter terminals for connecting said windings to a voltage circuit, selective switch means for selectively connecting said windings with said terminals to provide ammeter, voltmeter and wattmeter actuation of said movable winding, said switch means being arranged to cut said movable coil out of circuit with said ammeter terminals, and a compensating resistance placed in circuit with the voltmeter terminals by said switch for wattmeter use.

17. A combined wattmeter, voltmeter and ammeter, having a movable winding and a fixed winding, ammeter and voltmeter terminals, said windings and terminals being initially connected for use as an ammeter, and selective switching means for connecting the ends of said windings in series with said voltmeter terminals and for connecting said windings in parallel with said voltmeter and ammeter terminals for measuring watts.

18. A combined wattmeter, voltmeter and ammeter, having a movable winding and a fixed winding, ammeter and voltmeter terminals, and selective switching means for connecting the ends of said windings in series with said voltmeter terminals for measuring volts or in series with said ammeter terminals for measuring amperes and for connecting said windings in parallel with said voltmeter and ammeter terminals for measuring watts.

19. A combined wattmeter, voltmeter and ammeter, having a movable winding and a fixed winding, ammeter and voltmeter terminals, and selective switching means for connecting the ends of said windings in series with said voltmeter terminals for measuring volts or in series with said ammeter terminals for measuring amperes for connecting said windings in parallel with said voltmeter and ammeter terminals for measuring watts, and a current transformer interposed between said ammeter terminals and said windings.

20. In a combined ammeter and voltmeter, the combination of a fixed field winding with a movable dynamometer winding connected in series with said fixed field winding, said windings being high resistance windings, voltage terminals for said windings, current terminals for said windings and high resistance interposed between said voltage terminals and said windings, and a current reducing transformer interposed between said current terminals and said windings.

21. In a combined ammeter and voltmeter, the combination of a fixed field winding with a movable dynamameter winding connected in series with said fixed field winding, said windings being high resistance windings, voltage terminals for said windings, current terminals for said windings and high resistance interposed between said voltage terminals and said windings, a current reducing transformer interposed between said current terminals and said windings, and switch means for disconnecting one end of said transformer secondary from said windings and completing the circuit of said voltage terminals with said windings.

22. In a combined ammeter, voltmeter and wattmeter, the combination of a fixed field winding with a movable dynamometer winding connected in series with said fixed field winding, said windings being high resistance windings, voltage terminals for said windings, current terminals for said windings and high resistance interposed between said voltage terminals and said windings, a current reducing transformer interposed between said current terminals and said windings, and switch means for connecting one end of said transformer secondary to the juncture between said windings and for completing the connections of said voltage terminals to the fixed winding.

23. A combined wattmeter, voltmeter and ammeter, comprising a fixed winding and a movable winding having indicating means, voltmeter terminals normally connected with said windings to provide a voltmeter, ammeter terminals, switch means for cutting out said voltmeter and connecting said ammeter terminals to said windings to provide an ammeter, and switch means for changing the connections of said terminals and windings to provide a wattmeter.

24. A combined voltmeter and ammeter, comprising a fixed winding and a movable winding having indicating means, voltmeter terminals normally connected with said windings to provide a voltmeter, ammeter terminals, and unitary switch means for cutting out said voltmeter and connecting said ammeter terminals to said windings to provide an ammeter.

25. A combined voltmeter, ammeter, and wattmeter, comprising suitable terminals for voltmeter, ammeter and wattmeter operations, indicating means adapted to be used for said operations, and a torque producing means comprising a fixed electrical element and a movable electrical element, and means for changing the connections of the same electrical elements at will for voltmeter, ammeter, and wattmeter operations.

In witness whereof, I hereunto subscribe my name this 18th day of April, 1928.

JOHN H. MILLER.